(12) United States Patent
Zhao et al.

(10) Patent No.: US 10,371,854 B2
(45) Date of Patent: Aug. 6, 2019

(54) SAFETY INSPECTION APPARATUS

(71) Applicants: NUCTECH COMPANY LIMITED, Beijing (CN); NUCTECH JIANGSU COMPANY LIMITED, Changzhou (CN)

(72) Inventors: Ziran Zhao, Beijing (CN); Zhiqiang Chen, Beijing (CN); Wanlong Wu, Beijing (CN); Li Zhang, Beijing (CN); Yingkang Jin, Beijing (CN); Ming Ruan, Beijing (CN)

(73) Assignees: NUCTECH COMPANY LIMITED, Beijing (CN); NUCTECH JIANGSU COMPANY LIMITED, Beijing (CN)

( * ) Notice: Subject to any disclaimer, the term of this patent is extended or adjusted under 35 U.S.C. 154(b) by 341 days.

(21) Appl. No.: 15/230,316

(22) Filed: Aug. 5, 2016

(65) Prior Publication Data
US 2017/0068017 A1    Mar. 9, 2017

(30) Foreign Application Priority Data
Sep. 8, 2015   (CN) .......................... 2015 1 0567902

(51) Int. Cl.
*G01V 5/00*        (2006.01)
(52) U.S. Cl.
CPC .................................. *G01V 5/0016* (2013.01)
(58) Field of Classification Search
CPC .................................................... G01V 5/0016
See application file for complete search history.

(56) References Cited

U.S. PATENT DOCUMENTS

| 2008/0298545 A1* | 12/2008 | Bueno | G01V 5/0016 378/57 |
| 2009/0285353 A1* | 11/2009 | Ellenbogen | G01V 5/005 378/9 |
| 2013/0148777 A1* | 6/2013 | Ikhlef | A61B 6/027 378/19 |

(Continued)

FOREIGN PATENT DOCUMENTS

WO    WO 2015/016205 A1    2/2015

OTHER PUBLICATIONS

Canada Patent Application No. 2930261; Office Action; dated Feb. 15, 2017; 5 pages.

(Continued)

*Primary Examiner* — Mark R Gaworecki
(74) *Attorney, Agent, or Firm* — BakerHostetler

(57) ABSTRACT

A safety inspection apparatus is disclosed in embodiments of the present invention. The safety inspection apparatus includes: an x-ray source including a ray emission focal spot; and a plurality of detector modules each of which has a ray receiving surface, and which are arranged along a plurality of straight line segments. The plurality of straight line segments include a first straight line segment and two second straight line segments, and, the two second straight line segments extend from the two ends of the first straight line segment towards the x-ray source side, respectively. In a plane where the sectorial ray beam is located, a normal to the ray receiving surface of each of the detector modules at a midpoint of the ray receiving surface of the each of the detector modules passes generally through the ray emission focal spot of the x-ray source.

18 Claims, 2 Drawing Sheets

(56) References Cited

U.S. PATENT DOCUMENTS

| | | | |
|---|---|---|---|
| 2014/0185743 A1 | 7/2014 | Zhang et al. | |
| 2014/0185744 A1* | 7/2014 | Zhang | G01T 1/2985 |
| | | | 378/10 |
| 2016/0174922 A1 | 6/2016 | Kodera et al. | |
| 2016/0252647 A1* | 9/2016 | Awad | G01V 5/005 |
| | | | 348/48 |

OTHER PUBLICATIONS

Canada Patent Application No. 2,930,261; Office Action; dated Dec. 5, 2017, 3 pages.
Canada Patent Application No. 2,930,261; Office Action; dated Jul. 31, 2018; 6 pages.

\* cited by examiner

SAFETY INSPECTION APPARATUS

BACKGROUND

1. Technical Field

Embodiments of the present invention relate to a safety inspection apparatus.

2. Description of the Related Art

A safety inspection apparatus comprises an x-ray source and a plurality of detector modules and can be used for inspecting articles concealed inside a human body. X-ray radioscopy imaging is a current main technical means for inspecting the articles (especially drugs) concealed inside the human body. A sectorial ray beam emitted by an x-ray source passes through a human body under inspection and forms energy deposition on an array of detectors behind the human body. A column of human body image signals are formed by analyzing and processing by means of a computer. With the help of a scanning mechanism, a two-dimensional x-ray radioscopy image of the human body can be obtained. Distribution of the array of detectors determines quality of the image signal directly and also affects a volume of the entire apparatus.

SUMMARY

Embodiments of the present invention provide a safety inspection apparatus comprising: an x-ray source comprising a ray emission focal spot and configured to emit a sectorial ray beam from the ray emission focal spot; and a plurality of detector modules each of which has a ray receiving surface, and which are arranged along a plurality of straight line segments, wherein: the plurality of straight line segments comprise a first straight line segment and two second straight line segments, one end of one of the two second straight line segments is connected to one of two ends of the first straight line segment, one end of the other of the two second straight line segments is connected to the other of the two ends of the first straight line segment, the two second straight line segments extend from the two ends of the first straight line segment towards the x-ray source side, respectively, and in a plane where the sectorial ray beam is located, a normal to the ray receiving surface of each of the detector modules at a midpoint of the ray receiving surface of the each of the detector modules passes generally through the ray emission focal spot of the x-ray source.

According to embodiments of the present invention, the ray receiving surfaces of the detector modules are flat surfaces.

According to embodiments of the present invention, the plurality of straight line segments are in a generally [-shape as a whole.

According to embodiments of the present invention, the two second straight line segments are generally perpendicular to the first straight line segment.

According to embodiments of the present invention, an included angle between the first straight line segment and each of the two second straight line segments is greater than or equal to 90 degrees.

According to embodiments of the present invention, an included angle between the first straight line segment and at least one of the two second straight line segments is an obtuse angle.

According to embodiments of the present invention, the plurality of straight line segments further comprise a third straight line segment, and the third straight line segment extends from the other end of the one of the two second straight line segments towards the x-ray source side, and an included angle between the first straight line segment and the one of the two second straight line segments is an obtuse angle.

According to embodiments of the present invention, the plurality of straight line segments further comprise two third straight line segments, one of the two third straight line segments extends from the other end of the one of the two second straight line segments towards the x-ray source side, and the other of the two third straight line segments extends from the other end of the other of the two second straight line segments towards the x-ray source side, and an included angle between the first straight line segment and each of the two second straight line segments is an obtuse angle.

According to embodiments of the present invention, a direction in which the first straight line segment extends is generally perpendicular to another direction in which the third straight line segment extends.

According to embodiments of the present invention, a direction in which the first straight line segment extends is generally perpendicular to another direction in which the two third straight line segments extend.

According to embodiments of the present invention, an included angle between the third straight line segment and each of the two second straight line segments is an obtuse angle.

According to embodiments of the present invention, an included angle between the one of the two second straight line segments and the one of the two third straight line segments is an obtuse angle, and an included angle between the other of the two second straight line segments and the other of the two third straight line segments is an obtuse angle.

According to embodiments of the present invention, in a direction in which the first straight line segment extends, the ray emission focal spot of the X-ray source is located generally at a same position as a midpoint of the first straight line segment.

According to embodiments of the present invention, a direction in which the first straight line segment extends is generally a vertical direction.

According to embodiments of the present invention, the plurality of straight line segments are located generally in a same plane.

According to embodiments of the present invention, the plurality of straight line segments and the ray emission focal spot of the x-ray source are located generally in a same plane.

According to embodiments of the present invention, the plane extends generally in a vertical direction.

According to embodiments of the present invention, in the vertical direction, the ray emission focal spot of the x-ray source is located generally at a same position as a midpoint of, the plurality of straight line segments regarded as a whole.

According to embodiments of the present invention, in a plane where the sectorial ray beam is located, the ray receiving surfaces of the plurality of detector modules are arranged such that the whole ray receiving surface of each of the plurality of detector modules is capable of receiving rays, and the rays cannot pass between adjacent ones of the ray receiving surfaces.

According to embodiments of the present invention, the safely inspection apparatus is a safety inspection apparatus for a human body.

BRIEF DESCRIPTION OF THE DRAWINGS

The above and/or other aspects and advantages of the present invention will be apparent and more readily appreciated from the following description of embodiments taken in conjunction with the accompanying drawings, in which.

DETAILED DESCRIPTION OF THE EMBODIMENTS

Figures 1, 2:
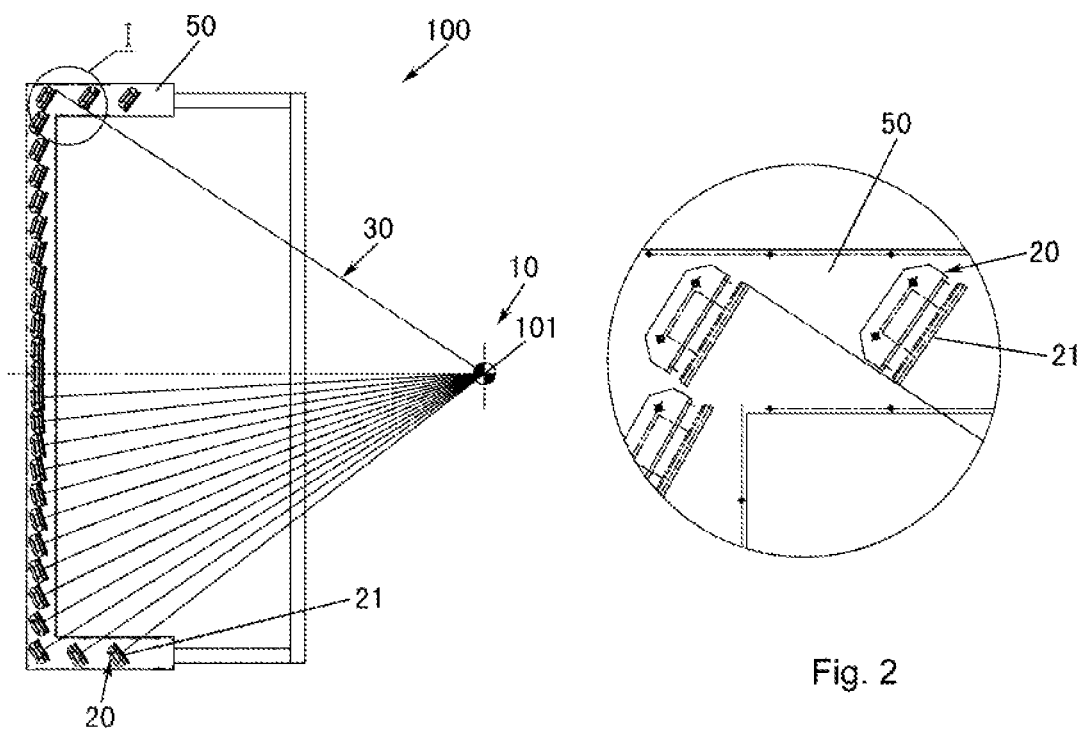
FIG. 1 is a schematic diagram of a safety inspection apparatus according to an embodiment of the present invention.
FIG. 2 is a schematic enlarged diagram of the portion I, shown in FIG. 1, of the safety inspection apparatus according to the embodiment of the present invention.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 8, a safety inspection apparatus 100 according to an embodiment of the present invention comprises: an x-ray source 10 comprising a ray emission focal spot 101 (for example, a single ray emission focal spot 101) and configured to emit a sectorial ray beam 30 from the ray emission focal spot 101; and a plurality of detector modules 20 each of which has a ray receiving surface 21, and which are arranged along a plurality of straight line segments 60. The plurality of straight line segments 60 comprise a first straight line segment 61 and two second straight line segments 62. One end of one of the two second straight line segments 62 is connected to one of two ends of the first straight line segment 61, one end of the other of the two second straight line segments 62 is connected to the other of the two ends of the first straight line segment 61, and the two second straight line segments 62 extend from the two ends of the first straight line segment 61 towards the x-ray source 10 side, respectively. In a plane (which is parallel to the plane of the paper, referring to FIG. 1) where the sectorial ray beam 30 is located, a normal to each ray receiving surface 21 at a midpoint of the each ray receiving surface 21 passes generally through the ray emission focal spot 101 of the x-ray source 10. Each of the ray receiving surfaces 21 faces the ray emission focal spot 101 of the x-ray source 10. The plurality of detector modules 20 may be mounted to an arm support 50. The safety inspection apparatus may be a safety inspection apparatus for a human body, or an x-ray transmission safely inspection apparatus for a human body. During a safety inspection, a person passes between the x-ray source 10 and the detector modules 20 by walking, or by standing on a conveyer such as a belt conveyer, so that a transmission image of a human body is acquired by the safety inspection apparatus 100.

As shown in FIGS. 1 to 2, the ray receiving surfaces 21 of the detector modules 20 may be flat surfaces or curved surfaces.

Figure 3:
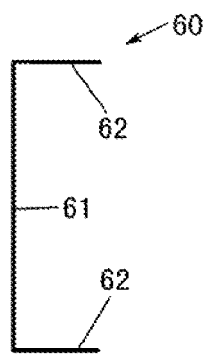
FIG. 3 is a schematic diagram showing an arrangement of detector modules of the safety inspection apparatus according to the embodiment shown in FIG. 1 of the present invention.
Figure 4:
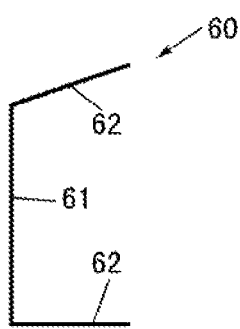
FIG. 4 is a schematic diagram showing an arrangement of the detector modules of the safety inspection apparatus according to an embodiment of the present invention.
Figure 5:
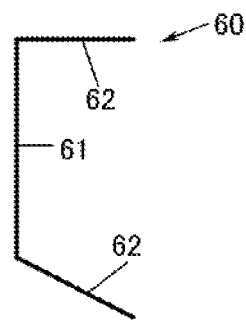
FIG. 5 is a schematic diagram showing an arrangement of the detector modules of the safety inspection apparatus according to another embodiment of the present invention.
Figure 6:
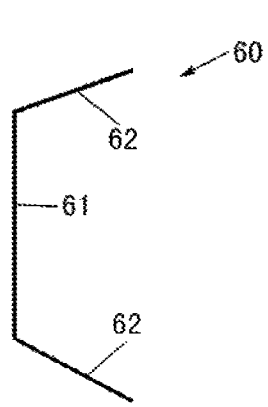
FIG. 6 is a schematic diagram showing an arrangement of the detector modules of the safely inspection apparatus according to a further embodiment of the present invention.

In the example shown in FIGS. 1 and 3, the plurality of detector modules 20 are arranged in a generally [-shape, or the plurality of straight line segments 60 as a whole have a generally [-shape.

As shown in FIGS. 1 and 3, the two second straight line segments 62 may be generally perpendicular to the first straight line segment 61.

In some embodiments of the present invention, as shown in FIGS. 3 to 8, an included angle between the first straight line segment 61 and each of the two second straight line segments 62 is greater than or equal to 90 degrees. For example, an included angle between the first straight line segment 61 and at least one of the two second straight line segments 62 is an obtuse angle.

Figure 7:
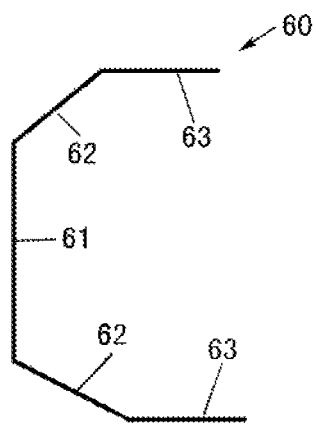
FIG. 7 is a schematic diagram showing an arrangement of the detector modules of the safety inspection apparatus according to a still another embodiment of the present invention.
Figure 8:
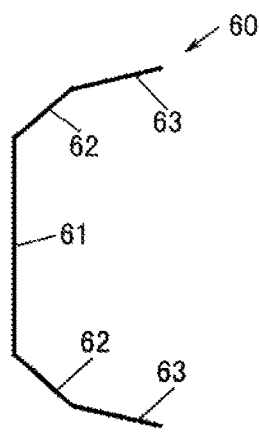
FIG. 8 is a schematic diagram showing an arrangement of the detector modules of the safety inspection apparatus according to a still further embodiment of the present invention.

In some embodiments of the present invention, referring to FIGS. 1, 7 and 8, the plurality of straight line segments 60 further comprise a third straight line segment 63, and the third straight line segment 63 extends from the other end of the one of the two second straight line segments 62 towards the x-ray source 10 side, and an included angle between the first straight line segment 61 and the one of the two second straight line segments 62 is an obtuse angle. For example, a direction in which the first straight line segment 61 extends may be generally perpendicular to another direction in which the third straight line segment 63 extends. An included angle between the third straight line segment 63 and each of the two second straight line segments 62 may be an obtuse angle. Although FIGS. 7 and 8 show that the plurality of straight line segments 60 comprise two third straight line segments 63, the plurality of straight line segments 60 may comprise a single third straight line segment 63.

In some other embodiments of the present invention, referring to FIGS. 1, 7 and 8, the plurality of straight line segments 60 further comprise two third straight line segments 63, one of the two third straight line segments 63 extends from the other end of the one of the two second straight line segments 62 towards the x-ray source 10 side, and the other of the two third straight line segments 63 extends from the other end of the other of the two second straight line segments 62 towards the x-ray source 10 side, and an included angle between the first straight line segment 61 and each of the two second straight line segments 62 is an obtuse angle. For example, a direction in which the first straight line segment 61 extends may be generally perpendicular to another direction in which the two third straight line segment 63 extend. An included angle between the one of the two second straight line segments 62 and the one of the two third straight line segments 63 may be an obtuse angle, and an included angle between the other of the two second straight line segments 62 and the other of the two third straight line segments 63 may be an obtuse angle.

In some other embodiments of the present invention, referring to FIGS. 1, and 3 to 8, in a direction (namely an up-down direction in FIG. 1) in which the first straight line segment 61 extends, the ray emission focal spot 101 of the x-ray source 10 is located generally at a same position as a midpoint or a center of the first straight line segment 61. The direction in which the first straight line segment 61 extends may be a generally vertical direction. Thereby, the safety inspection apparatus has an improved effect on an image of an abdomen of as person under inspection. The abdomen is just a main region where articles concealed inside a human body. A clear image of feet can be acquired due to detector modules arranged along the second straight line segment 62, or the second straight line segment 62 and the third straight line segment 63 on a lower side. A height of an arrangement of the detector modules can be reduced due to detector modules arranged along the second straight line segment 62, or the second straight line segment 62 and the third straight line segment 63 on an upper side. Furthermore, the detector modules become closer to the ray emission focal spot 101 of the X-ray source 10 so that quality of the image is better. According to some embodiments of the present invention, the plurality of straight line segments 60 are located generally in a same plane. Alternatively, the plurality of straight line segments 60 and the ray emission focal spot 101 of the x-ray source 10 are located generally in a same plane. For example, the sectorial ray beam 30 is also located in the same plane. The plane may extend in a vertical direction. In the vertical direction, the ray emission focal spot 101 of the x-ray source 10 may be located generally at a same position as a midpoint or a center of the plurality of straight line segments 60 regarded as a whole. Thereby, the safety inspection apparatus has an improved effect on an image of an abdomen of as person under inspection. The abdomen is just a main region where articles concealed inside a human body. A clear image of feet can be acquired due to detector modules arranged along the second straight line segment 62, or the second straight line segment 62 and the third straight line segment 63 on a lower side. A height of an arrangement of the detector modules can be reduced due to detector modules arranged along the second straight line segment 62, or the second straight line segment 62 and the third straight line segment 63 on an upper side. Furthermore, the detector modules become closer to the ray emission focal spot 101 of the X-ray source 10 so that quality of the image is better.

As shown in FIGS. 1 and 2, in a plane where the sectorial ray beam 30 is located, the ray receiving surfaces 21 of the plurality of detector modules 20 are arranged such that the whole ray receiving surface 21 of each of the plurality of detector modules 20 is capable of receiving rays, and the rays cannot pass between adjacent ones of the ray receiving surfaces 21.

According to embodiments of the present invention, as shown in FIG. 1, the x-ray source 10 or the ray emission focal spot 101 of the x-ray source 10 may be placed generally at a same height as an abdomen of a person under inspection.

Since the plurality of detector modules are arranged as above, and the normal to each ray receiving surface at a midpoint of the each ray receiving surface passes generally through the ray emission focal spot of the x-ray source, the arm support of the detector modules has a simple structure and can be easily manufactured.

Further, the normal to each ray receiving surface at the midpoint of the each ray receiving surface passes generally through the ray emission focal spot of the x-ray source, thereby greatly reducing crosstalk among the detector modules and thus improving image quality.

Finally, with the safely inspection apparatus of the embodiments of the present invention, good inspection effect can be obtained with a simple structure.

The above embodiments are only used to explain the present invention, and should not be construed to limit the present invention. It will be understood by those skilled in the art that various changes and modifications may be made therein without departing from the spirit and scope of the present invention, the scope of which is defined in the appended claims and their equivalents.

What is claimed is:

1. A safety inspection apparatus for a human body, comprising:
   an x-ray source, comprising a single ray emission focal spot and configured to emit a sectorial ray beam from the single ray emission focal spot;
   a plurality of detector modules, each of which has a ray receiving surface, and which are arranged along a plurality of straight line segments, wherein: the plurality of straight line segments comprise a first straight line segment and two second straight line segments, one end of one of the two second straight line segments is connected to one of two ends of the first straight line segment, one end of the other of the two second straight line segments is connected to the other of the two ends of the first straight line segment, and, the two second straight line segments extend from the two ends of the first straight line segment towards the x-ray source side, respectively;
   an imaging device for acquiring a transmission image of a human body under inspection based on a ray that passes through the human body and is received by the plurality of detector modules;
   wherein in a plane where the sectorial ray beam is located, a normal to the ray receiving surface of each of the detector modules at a midpoint of the ray receiving surface of the each of the detector modules passes generally through the ray emission focal spot of the x-ray source; and
   wherein a direction in which the first straight line segment extends is a vertical direction.

2. The safety inspection apparatus of claim 1, wherein: the ray receiving surfaces of the detector modules are flat surfaces.

3. The safety inspection apparatus of claim 1, wherein: the plurality of straight line segments are in a generally [-shape as a whole.

4. The safety inspection apparatus of claim 1, wherein: the two second straight line segments are generally perpendicular to the first straight line segment.

5. The safety inspection apparatus of claim 1, wherein: an included angle between the first straight line segment and each of the two second straight line segments is greater than or equal to 90 degrees.

6. The safety inspection apparatus of claim 5, wherein: an included angle between the first straight line segment and at least one of the two second straight line segments is an obtuse angle.

7. The safety inspection apparatus of claim 1, wherein: the plurality of straight line segments further comprise a third straight line segment, and the third straight line segment extends from the other end of the one of the two second straight line segments towards the x-ray source side, and an included angle between the first straight line segment and the one of the two second straight line segments is an obtuse angle.

8. The safety inspection apparatus of claim 7, wherein:
a direction in which the first straight line segment extends is generally perpendicular to another direction in which the third straight line segment extends.

9. The safety inspection apparatus of claim 7, wherein:
an included angle between the third straight line segment and each of the two second straight line segments is an obtuse angle.

10. The safety inspection apparatus of claim 1, wherein:
the plurality of straight line segments further comprise two third straight line segments, one of the two third straight line segments extends from the other end of the one of the two second straight line segments towards the x-ray source side, and the other of the two third straight line segments extends from the other end of the other of the two second straight line segments towards the x-ray source side, and an included angle between the first straight line segment and each of the two second straight line segments is an obtuse angle.

11. The safety inspection apparatus of claim 10, wherein:
a direction in which the first straight line segment extends is generally perpendicular to another direction in which the two third straight line segments extend.

12. The safety inspection apparatus of claim 10, wherein:
an included angle between the one of the two second straight line segments and the one of the two third straight line segments is an obtuse angle, and an included angle between the other of the two second straight line segments and the other of the two third straight line segments is an obtuse angle.

13. The safety inspection apparatus of claim 1, wherein:
in a direction in which the first straight line segment extends, the ray emission focal spot of the X-ray source is located generally at a same position as a midpoint of the first straight line segment.

14. The safety inspection apparatus of claim 1, wherein:
the plurality of straight line segments are located generally in a same plane.

15. The safety inspection apparatus of claim 14, wherein:
the plane extends generally in a vertical direction.

16. The safety inspection apparatus of claim 1, wherein:
the plurality of straight line segments and the ray emission focal spot of the x-ray source are located generally in a same plane.

17. The safety inspection apparatus of claim 15, wherein:
in the vertical direction, the ray emission focal spot of the x-ray source is located generally at a same position as a midpoint of, the plurality of straight line segments regarded as a whole.

18. The safety inspection apparatus of claim 1, wherein:
in a plane where the sectorial ray beam is located, the ray receiving surfaces of the plurality of detector modules are arranged such that the whole ray receiving surface of each of the plurality of detector modules is capable of receiving rays, and the rays cannot pass between adjacent ones of the ray receiving surfaces.

* * * * *